United States Patent [19]

Aldridge et al.

[11] 4,066,530
[45] Jan. 3, 1978

[54] HYDROCONVERSION OF HEAVY HYDROCARBONS

[75] Inventors: Clyde L. Aldridge; Roby Bearden, Jr., both of Baton Rouge, La.

[73] Assignee: Exxon Research & Engineering Co., Linden, N.J.

[21] Appl. No.: 745,394

[22] Filed: Nov. 26, 1976

Related U.S. Application Data

[63] Continuation-in-part of Ser. No. 702,227, July 2, 1976.

[51] Int. Cl.² .................. C10G 13/06; B01J 27/04
[52] U.S. Cl. ................................ 208/112; 208/207; 208/215; 208/217; 252/439; 252/467; 252/471; 252/472; 252/477 R
[58] Field of Search ............... 208/112, 206, 207, 208, 208/215, 217

[56] References Cited

U.S. PATENT DOCUMENTS

| | | | |
|---|---|---|---|
| 1,876,270 | 9/1932 | Zorn | 252/431 R |
| 2,091,831 | 8/1937 | Pongratz et al. | 208/108 |
| 3,131,142 | 4/1964 | Mills | 208/108 |
| 3,161,585 | 12/1964 | Gleim et al. | 208/264 |
| 3,297,563 | 1/1967 | Doumani | 208/59 |
| 3,331,769 | 7/1967 | Gatsis | 208/210 |
| 3,617,503 | 11/1971 | Rogers et al. | 208/97 |
| 3,622,495 | 11/1971 | Gatsis et al. | 208/59 |
| 3,622,497 | 11/1971 | Gleim | 208/108 |
| 3,622,498 | 11/1971 | Stolfa et al. | 208/108 |
| 3,657,111 | 4/1972 | Gleim | 208/108 |

*Primary Examiner*—Delbert E. Gantz
*Assistant Examiner*—G. E. Schmitkons
*Attorney, Agent, or Firm*—Marthe L. Gibbons

[57] ABSTRACT

A catalytic hydroconversion process is effected by reacting with hydrogen a heavy hydrocarbonaceous oil containing a catalyst comprising an iron component and a catalytically active other metal component prepared by dissolving an oil soluble metal compound in the oil and converting the metal compound in the oil to the corresponding catalytically active metal component. Preferred oil soluble compounds are molybdenum compounds.

33 Claims, 1 Drawing Figure

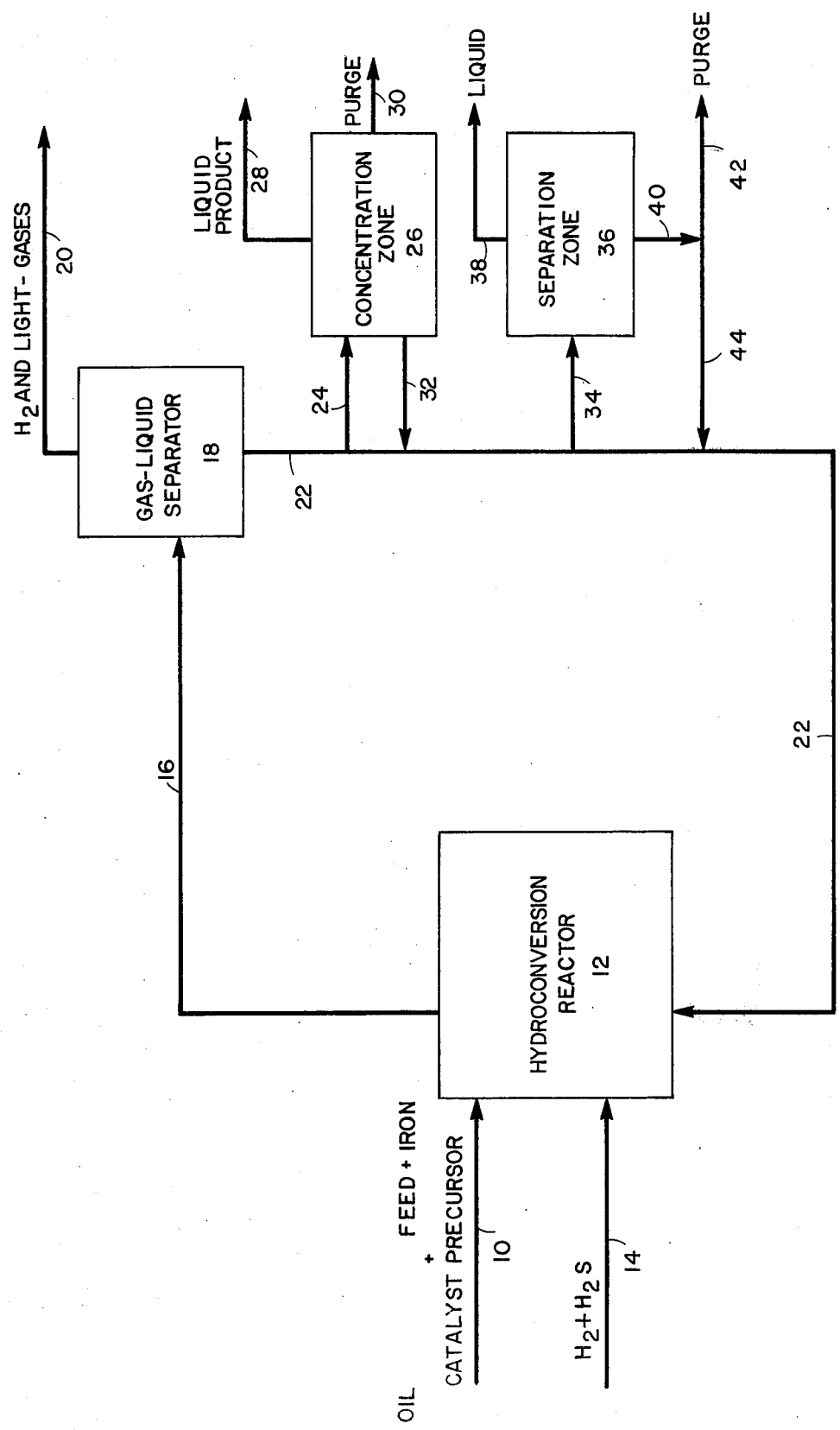

HYDROCONVERSION OF HEAVY HYDROCARBONS

CROSS REFERENCE TO RELATED APPLICATIONS

This application is a continuation-in-part of copending application Ser. No. 702,227 filed July 2, 1976, all the teachings of which are incorporated herein by specific reference thereto.

BACKGROUND OF THE INVENTION

1. Field of the Invention

This invention relates to a process for the hydroconversion of a heavy hydrocarbonaceous oil in the presence of a catalyst comprising a particulate iron component and a catalytically active metal component of a metal other than iron. The catalytically active metal component is prepared in situ from small amounts of metals added to the oil as oil-soluble metal compounds.

2. Description of the Prior Art

Hydrorefining processes utilizing dispersed catalysts in admixture with a hydrocarbonaceous oil are well known.

U.S. Pat. No. 3,161,585 discloses a hydrorefining process in which a petroleum oil chargestock containing a colloidally dispersed catalyst selected from the group consisting of a metal of Groups VB and VIB, an oxide of said metal and a sulfide of said metal is reacted with hydrogen at hydrorefining conditions. This patent teaches that the concentration of the dispersed catalyst, calculated as the elemental metal, in the oil chargestock is from about 0.1 weight percent to about 10 weight percent of the initial chargestock.

U.S. Pat. No. 3,331,769 discloses a hydrorefining process in which a metal component (Group VB, Group VIB, iron group metal) colloidally dispersed in a hydrocarbonaceous oil is reacted in contact with a fixed bed of a conventional supported hydrodesulfurization catalyst in the hydrorefining zone. The concentration of the dispersed metal component which is used in the hydrorefining stage in combination with the supported catalyst ranges from 250 to 2,500 weight parts per million (wppm).

U.S. Pat. No. 3,657,111 discloses a process for hydrorefining an asphaltene-containing hydrocarbon chargestock which comprises dissolving in the chargestock a hydrocarbon-soluble oxovanadate salt and forming a colloidally dispersed catalytic vanadium sulfide in situ within the chargestock by reacting the resulting solution, at hydrorefining, conditions, with hydrogen and hydrogen sulfide.

It is also known to use finely divided Group VIII metal components in a catalytic slurry process for the hydrogenative conversion of heavy oils. See, for example, U.S. Pat. Nos. 3,617,503; 3,297,563 and 3,622,498.

It has now been found that coke formation can be minimized in a catalyzed hydroconversion process for heavy oils when an added particulate iron component is used in combination with a catalytically active metal component prepared in situ in the oil from an oil soluble compound of a metal selected from Group VB, Group VIB, Group VIIB, and a metal of Group VIII other than iron.

The term "hydroconversion" is used herein to designate a process conducted in the presence of hydrogen in which at least a portion of the heavy constituents and coke precursors (as measured by Conradson carbon residue) of the hydrocarbonaceous oil is converted to lower boiling hydrocarbon products while simultaneously reducing the concentration of nitrogeneous compounds, sulfur compounds and metallic contaminants.

SUMMARY OF THE INVENTION

In accordance with the invention, there is provided a process for hydroconverting a heavy hydrocarbon oil chargestock, which comprises: reacting a heavy hydrocarbon oil chargestock containing a catalyst with hydrogen at hydroconversion conditions in a hydroconversion zone, said catalyst comprising an effective amount of an iron component and a catalytically active metal component selected from the group consisting of Group VB, VIB, Group VIIB, Group VIII metals other than iron, of the Periodic Table of Elements and mixtures thereof, said iron component being added to said chargestock as solid particles, and said catalytically active metal component having been prepared by the two steps of a. adding to said heavy hydrocarbon oil chargestock an effective amount of an oil soluble metal compound, said metal being selected from the group consisting of Group VB, Group VIB, Group VIIB, and Group VIII metals other than iron, of the Periodic Table of Elements, and mixtures thereof; and b. converting said oil soluble metal compound to a catalytically active metal component within said chargestock in the presence of a hydrogen-containing gas.

BRIEF DESCRIPTION OF THE DRAWING

The FIGURE is a schematic flow plan of one embodiment of the invention.

DETAILED DESCRIPTION OF THE INVENTION

The process of the invention is generally applicable to heavy hydrocarbonaceous oils. Suitable heavy hydrocarbonaceous oil chargestocks include heavy mineral oils; whole or topped petroleum crude oils, including heavy crude oils and fractions thereof such as asphaltenes; residual oils such as petroleum atmospheric distillation tower residua (boiling above about 650° F., i.e., 343.33° C) and petroleum vacuum distillation tower residua (vacuum residua., boiling above about 1050° F., i.e., 565.55° C.); tars; bitumen; tar sand oils; shale oils. The process is particularly well suited to heavy crude oils and residual oils which generally contain a high content of metallic contaminants (nickel, iron, vanadium) usually present in the form of organometallic compounds, e.g., metalloporphyrins, a high content of sulfur compounds, a high content of nitrogenous compounds and a high Conradson carbon residue. The metal content of such oils may range up to 2,000 wppm or more and the sulfur content may range up to 8 weight percent or more. The API gravity at 60° F. of such feeds may range from about −5° API to about +35° API and the Conradson carbon residue of the heavy feeds will generally range from about 5 to about 50 weight percent (as to Conradson carbon residue, see ASTM test D-189-65). Preferably, the feed stock is a heavy hydrocarbon oil having at least 10 weight percent of material boiling above 1050° F. (565.56° C) at atmospheric pressure, more preferably having at least about 25 weight percent of material boiling above 1050° F. (565.56° C.) at atmospheric pressure.

A solid particulate iron component is added to the heavy hydrocarbon oil chargestock. Suitable iron components include elemental iron, iron oxides, iron sulfides, naturally occurring iron-containing ores, mineral mixtures, iron-containing ash materials derived from coal, bitumen and the like, fly ash, iron-containing by-products from metal refining operations, e.g., red mud, etc. Desirably, the particle sizes of the iron component may range broadly from about 0.5 micron to about 200 microns, preferably from about 0.5 to 20 microns in diameter. The iron component, calculated as if it existed as elemental iron, based on the weight of the initial oil chargestock is suitably added to the oil feed in amounts ranging from about 0.01 to about 30 weight percent, preferably from about 0.01 to 10 weight percent, and more preferably from about 0.01 to about 1 weight percent. It should be understood that the given amounts of iron component refer to amounts which are added to the oil feed in excess of any iron that may be present as metallic contaminant in the oil feed.

An oil soluble metal compound is also added to the heavy hydrocarbon oil chargestock. The oil soluble metal compound may be added to the oil chargestock, before, simultaneously or after the addition of the iron component. Suitable amounts of oil soluble metal compound to be added to the chargestock include from about 10 to less than 1000 weight parts per million (wppm), preferably from about 25 to 950 wppm, more preferably from about 50 to about 300 wppm, most preferably from about 50 to about 200 wppm, said weight being calculated as if the compound existed as the elemental metal, based on the initial oil chargestock.

Suitable oil soluble metal compounds convertible (under process conditions) to catalysts include (1) inorganic metal compounds such as halides, oxyhalides, hydrated oxides, heteropoly acids (e.g., phosphomolybdic acid, molydosilicic acid); (2) metal salts of organic acids such as acyclic and alicyclic aliphatic carboxylic acids containing two or more carbon atoms (e.g., naphthenic acids); aromatic carboxylic acids (e.g., toluic acid); sulfonic acids (e.g., toluenesulfonic acid); sulfinic acids; mercaptans, xanthic acid; phenols, di and polyhydroxy aromatic compounds; (3) organometallic compounds such as metal chelates, e.g., with 1,3-diketones, ethylene diamine, ethylene diamine tetraacetic acid; etc.; (4) metal salts of amines such as aliphatic amines, aromatic amines, and quaternary ammonium compounds.

The metal constituent of the oil soluble metal compound, that is convertible to a catalyst, is selected from the group consisting of Group VB, Group VIB, Group VIIB and a metal of Group VIII other than iron, that is, a Group VIII metal having atomic numbers 27, 28, 44, 45, 46, 76, 77, 78, and mixtures thereof of the Periodic Table of Elements, in accordance with the table published by E. H. Sargent and Company, copyright 1962, Dyna Slide Company, that is, vanadium, niobium, tantalum, chromium, molybdenum, tungsten, manganese, rhenium, cobalt, nickel and the noble metals including platinum, iridium, palladium, osmium, ruthenium and rhodium. The preferred metal constituent of the oil soluble metal compound is selected from the group consisting of molybdenum, vanadium and chromium. More preferably, the metal constituent of the oil-soluble metal compound is selected from the group consisting of molybdenum and chromium. Most preferably, the metal constituent of the oil soluble compound is molybdenum. Preferred compounds of the given metals include the salts of acyclic (straight or branched chain) aliphatic carboxylic acids, salts of alicyclic aliphatic carboxylic acids, heteropolyacids, hydrated oxides, carbonyls, phenolates, and organic amine salts. More preferred types of metal compounds are the heteropoly acids, e.g., phosphomolybdic acid. Another preferred metal compound is a salt of an alicyclic aliphatic carboxylic acid such as a metal naphthenate. The most preferred compounds are molybdenum naphthenate, vanadium naphthenate, chromium naphthenate and phosphomolybdic acid.

When the oil soluble compound is added to the hydrocarbonaceous chargestock, it first dissolves in the oil and subsequently, under pretreatment or under hydroconversion conditions herein described, is converted to a catalytically active metal component.

Various methods can be used to convert the dissolved compound in the oil. One method (pre-treatment method) of forming a catalyst from the oil soluble compound and the iron component of the present invention is to heat the hydrocarbon chargestock containing the dissolved metal compound and the solid iron component to a temperature ranging from about 325° C. to about 415° C. and at a pressure ranging from about 500 to about 5000 psig in the presence of a hydrogen-containing gas. Preferably the hydrogen-containing gas also comprises hydrogen sulfide. The hydrogen sulfide may comprise from about 1 to about 90 mole percent, preferably from about 2 to about 50 mole percent, more preferably from about 3 to about 30 mole percent, of the hydrogen-containing gas mixture. The thermal treatment in the presence of hydrogen or in the presence of hydrogen and hydrogen sulfide is believed to convert the metal compound to the corresponding metal-containing solid products which are catalytically active and act as coking inhibitors. The resulting catalyst contained within the oil charge is then introduced into a hydroconversion zone which will be subsequently described.

A preferred method of converting the oil-soluble metal compound of the present invention is to react the heavy hydrocarbon oil chargestock containing the oil soluble metal compound dissolved therein and containing a solid iron component mixed in the oil with a hydrogen-containing gas at hydroconversion conditions to produce the catalyst in the chargestock in situ in the hydroconversion zone. Preferably, the hydrogencontaining gas comprises from about 1 to about 10 mole percent, more preferably from about 2 to 7 mole percent hydrogen sulfide. The conversion of the metal compound in the presence of the hydrogen-containing gas which may also contain hydrogen sulfide is believed to produce the corresponding metal-containing solid catalyst. Whatever the exact nature of the resulting metal-containing catalyst, the resulting metal component is a catalytic agent and a coking inhibitor.

It should be noted that although in the above description the iron component was added to the oil chargestock containing the oil soluble metal compound prior to converting the oil soluble compound to the catalytically active metal component, the iron component may be added to the oil chargestock at any convenient point prior to introducing the chargestock into the hydroconversion zone or the iron component may be added directly to the hydroconversion zone. Furthermore, the iron component can be added to the oil chargestock prior to converting the oil-soluble metal compound to the corresponding catalytically active metal component or after the conversion of the oil soluble metal compound to the catalytically active metal component.

The hydroconversion zone is maintained at a temperature ranging from about 343° to 538° C (650° to 1000° F), preferably from about 426° to 482° C (799° to 900° F), more preferably from about 440° to 468° C (824° to 874° F), and at a hydrogen partial pressure ranging from about 500 to about 5000 psig, preferably from about 1000 to about 3000 psig. Contact of the oil mixture under the hydroconversion conditions in the reaction zone with the hydrogen-containing gas converts the oil soluble metal compound together with the solid iron component to the corresponding catalyst in situ while simultaneously producing a hydroconverted oil. The hydroconverted oil containing solids is removed from the hydroconversion reaction zone. The solids may be seperated from the hydroconverted oil by conventional means, for example, by settling or centrifuging or filtration of the slurry or concentrated into a heavy bottoms stream by distillation. At least a portion of the separated solids or solids concentrate may be recycled directly to the hydroconversion zone or recycled to the hydrocarbonaceous oil chargestock. The space velocity, defined as volumes of oil feed per hour per volume of reactor (V/hr./V), may vary widely depending on the desired hydroconversion level. Suitable space velocities may range broadly from about 0.1 to 10 volumes of oil feed per hour per volume of reactor, preferably from about 0.25 to 6 V/hr./V, more preferably from about 0.5 to 2 V/hr./V. The process of the invention may be conducted either as batch or as continuous type operation.

DESCRIPTION OF THE PREFERRED EMBODIMENT

The preferred embodiment will be described with reference to the accompanying figure.

Referring to the figure, a petroleum atmospheric residuum feed, that is, a fraction having an atmospheric pressure boiling point of 650° F.+ (343.3° C.+) containing about 1 weight percent of added iron oxide ($Fe_2O_3$) particles of a size greater than colloidal and also containing less than 500 wppm of added oil soluble metal compound, preferably molybdenum naphthenate or phosphomolybdic acid, calculated as the elemental metal based on the initial residuum feed, is introduced by line 10 into a hydroconversion reactor 12 at a space velocity of 0.5 to 2 volumes of feed per hour per volume of reactor. A gaseous mixture comprising hydrogen and from about 2 to 7 mole percent hydrogen sulfide is introduced into reactor 12 by line 14. The hydroconversion reaction zone in reactor 12 is maintained at a temperature ranging from about 824° to 874° F. (440° to 468° C.) and under a hydrogen partial pressure ranging from about 1000 to 3000 psig. The hydroconversion reactor effluent is removed by line 16. The effluent comprises a hydroconverted oil product, gases, and the solid catalyst.

The effluent is introduced into a gas-liquid separator 18 where hydrogen and light hydrocarbons are removed overhead through line 20. Three preferred process options are available for the liquid stream containing dispersed catalyst solids which emerges from separator vessel 18 via line 22. In process option to be designated "A", the liquid-solids stream is fed by line 24 to concentration zone 26 where by means, for example, of distillation, solvent precipitation or centrifugation, the stream is separated into a clean liquid product, which is withdrawn through line 28, and a concentrated (i.e., 20 to 40% by weight) slurry of the catalyst solids in oil. At least a portion of the concentrated slurry can be removed as a purge stream through line 30, to control the buildup of solid materials in the hydroconversion reactor, and the balance of the slurry is returned by line 32 and line 22 to hydroconversion reactor 12. The purge stream may be filtered subsequently to recover catalyst and liquid product or it can be burned or gasified to provide, respectively, heat and hydrogen for the process.

In the process option to be designated "B", the purge stream from concentration zone 26 is omitted and the entire slurry concentrate withdrawn through line 32 is fed to separation zone 36 via lines 22 and 34. In this zone, a major portion of the remaining liquid phase is separated from the solids by means of centrifugation, filtration or a combination of settling and drawoff, etc. Liquid is removed from the zone through line 38 and solids through line 40. At least a portion of the solids and associated remaining liquid are purged from the process via line 42 to control the build-up of solids in the process and the balance of the solids are recycled to hydroconversion reactor 12 via line 44 which connects to recycle line 22. The solids can be recycled either as recovered or after suitable cleanup (not shown) to remove heavy adhering oil deposits and coke.

In option designated "C", the slurry of solids in oil exiting from separator 18 via line 22 is fed directly to separation zone 36 by way of line 34 whereupon solids and liquid product are separated by means of centrifugation or filtration. All or part of the solids exiting from vessel 36 via line 40 can be purged from the process through line 42 and the remainder recycled to the hydroconversion reactor. Liquid product is recovered through line 38. If desired, at least a portion of the heavy fraction of the hydroconverted oil product may be recycled to the hydroconversion zone. The following examples are presented to illustrate the invention.

EXAMPLE 1

Comparative hydroconversion experiments were made utilizing a Cold Lake crude oil feed. The catalysts and conditions used as well as the results are summarized in Table I.

TABLE I

| Conditions: 60 Min., 820° F., 2000+ psig $H_2$; 30 min. $H_2$ (2000+ psig) Pretreat, 725° F. | | | |
|---|---|---|---|
| | COKE YIELD, % | | |
| | 350 WPPM Mo* | 350 WPPM Mo 1.08% $Fe_2O_3$ | 350 WPPM Mo** 0.33% RED MUD*** |
| Run Series | I | II | III |
| 1st Cycle (Mo Naphthenate) | 0.37 | 0.53 | 0.45 |
| 2nd Cycle | 0.53 | 0.17 | 0.23 |
| 3rd Cycle | 1.12 | 0.16 | 0.26 |

*After First Cycle, catalyst was solids from preceding cycle.
**After First Cycle, catalyst was 5/6th of solids from the previous run (Cycle) + 1/6th make-up Mo Naphthenate (58 wppm Mo) and 1/6th make-up Red Mud (0.055 wt.%).
***Red mud contains 35 wt. % iron.

As can be seen from Table I, a catalyst prepared from an oil soluble metal compound in the presence of a particulate solid iron component retained, on recycle and reuse, its activity for coke suppression to a greater degree than such a catalyst prepared in the absence of an iron-containing particulate material.

The effectiveness of metals removal from the feed in these multi-cycle experiments is tabluated in Table II. It can be seen that the effectiveness of the catalyst for metals removal with repeated catalyst use was greater when an iron-containing particulate material was added along with the soluble metal catalyst precursor.

TABLE II

| Run Series | Nickel Removal, Wt.% | | | Vanadium Removal, Wt.% | | |
|---|---|---|---|---|---|---|
| | I | II | III | I | II | III |
| 1st Cycle | 85 | 84 | 88 | 91 | 86 | 93 |
| 2nd Cycle | 66 | 74 | 79 | 77 | 87 | 92 |
| 3rd Cycle | 68 | 76 | 79 | 78 | 88 | 93 |

EXAMPLE 2

Catalyst recycle experiments were made wherein an iron-containing coal ash was added to the first cycle run along with the oil soluble molybdenum naphthenate catalyst precursor. The solid catalyst recovered from the first cycle was then tested in two subsequent runs to determine activity maintenance in recycle use. As shown by the data in Table III, the cataylst comprised of molybdenum and the iron-containing coal ash showed good activity retention in recycle runs not only for coke and light gas suppression but also for metals removal and Conradson Carbon conversion.

TABLE III

EFFECT OF IRON CONTAINING COAL ASH ON RECYCLE CATALYST ACTIVITY

Cold Lake Crude Hydroconversion at 820° F. for 1 Hr., 2500 (Avg.) psig
Pretreatment for each cycle carried out at 725° F. for 30 min. with pure hydrogen (2000+psig)

| Run Number | 4R-40 | 4R-41 | 4R-45 |
|---|---|---|---|
| Cycle | 1 | 2 | 3 |
| Feed Charge, g. | 96.5 | 92.0 | 94.7 |
| Catalyst Composition | 0.034 g Molybdenum[A] 0.36 g Coal Ash[B] | Solids from 4R-40, 1.21 g. | Solids from 4R-41, 1.55 g. |
| $H_2$ Consumption, SCF/B | ~847 | 918 | 876 |
| Yields, wt.% on Feed | | | |
| $C_1-C_4$ | 2.88 | 2.21 | 2.35 |
| Coke | 0.80[C] | 0.28 | 0.35 |
| Liquid, $C_5^+$ | ~95.6 | 96.9 | 96.7 |
| Nickel removal, % | 78.5 | 78.0 | 73.5 |
| Vanadium removal, % | 85.3 | 89.0 | 89.0 |
| Conradson Carbon Conv., % | 48.5 | 50.0 | 51.5 |

[A]Added as molybdenum naphthenate, 6% Mo, from Shepherd Chem. Co.
[B]Contained in 3 g. of powdered, dry Illinois coal. Coal contains 12.11 wt. % ash. Concentration of iron in coal ash is 19.2 wt. %.
[C]Reflects coke contribution from coal component.

What is claimed is:

1. A process for hydroconverting a heavy hydrocarbon oil chargestock, which comprises: reacting a heavy hydrocarbon oil chargestock containing a catalyst with hydrogen at hydroconversion conditions in a hydroconversion zone, said catalyst comprising an effective amount of an iron component and a catalytically active metal component selected from the group consisting of Group VB, Group VIB, Group VIIB, Group VIII metals other than iron, of the Periodic Table of Elements, and mixtures thereof, said iron component being added to said oil chargestock as solid particles, and said catalytically active metal component having been prepared by the steps of:
   a. adding to said heavy hydrocarbon oil chargestock an effective amount of an oil soluble metal compound, said metal being selected from the group consisting of Group VB, Group VIB, Group VIIB and Group VIII metals other than iron, of the Periodic Table of Elements, and mixtures thereof, and
   d. converting said oil-soluble metal compound to a catalytically active metal component within said chargestock in the presence of a hydrogen-containing gas.

2. The process of claim 1 wherein said iron component is added to said heavy hydrocarbon oil chargestock prior to introducing said oil into said hydroconversion zone.

3. The process of claim 1 wherein said iron component is added to said heavy hydrocarbon oil chargestock at step (a) prior to converting said oil soluble metal compound to said catalytically active metal component.

4. The process of claim 1 wherein said iron component is added to said heavy hydrocarbon oil by introducing said iron component directly into said hydroconversion zone.

5. The process of claim 1 wherein said iron component is selected from the group consisting of elemental iron, iron oxides, iron sulfides, naturally occurring iron-containing ores, mineral mixtures, iron-containing ash derived from coal, bitumen and the like, fly ash, iron-containing by-products from metal refining processes and mixtures thereof.

6. The process of claim 1 wherein said iron component comprises a member selected from the group consisting of elemental iron, iron oxides, iron sulfides and mixtures thereof.

7. The process of claim 1 wherein said iron component is present in said hydroconversion zone in an amount ranging from about 0.01 to about 30 weight percent, calculated as the elemental metal based on said heavy oil.

8. The process of claim 1 wherein said added iron component is present in said hydroconversion zone in an amount ranging from about 0.01 to about 10 weight percent, calculated as the elemental metal based on said heavy oil.

9. The process of claim 1 wherein said iron component ranges in size from about 0.5 micron to about 200 microns in diameter.

10. The process of claim 1 wherein said iron component comprises elemental iron.

11. The process of claim 1 wherein said iron component comprises an iron oxide.

12. The process of claim 1 wherein said iron component comprises an iron sulfide.

13. The process of claim 1 wherein said iron component comprises a naturally occurring iron-containing material.

14. The process of claim 1 wherein said oil soluble metal compound is added to said oil chargestock in an amount ranging from about 10 to less than 1000 weight parts per million, calculated as the elemental metal, based on said oil chargestock.

15. The process of claim 1 wherein said oil soluble metal compound is selected from the group consisting of inorganic metal compounds, salts of organic acids, organo-metallic compounds and salts of amines.

16. The process of claim 1 wherein said oil soluble metal compound is selected from the group consisting of heteropoly acids, salts of acyclic aliphatic carboxylic acids and salts of alicyclic aliphatic carboxylic acids.

17. The process of claim 1 wherein said oil soluble metal compound is a salt of a naphthenic acid.

18. The process of claim 1 wherein said oil soluble metal compound is phosphomolybdic acid.

19. The process of claim 1 wherein the metal constituent of said oil soluble metal compound is selected from the group consisting of molybdenum, chromium and vanadium.

20. The process of claim 1 wherein said oil soluble metal compound is molybdenum naphthenate.

21. The process of claim 1 wherein said hydrogen-containing gas of step (b) comprises from about 1 to 10 mole percent hydrogen sulfide.

22. The process of claim 1 wherein said oil soluble metal compound is converted to said catalyst by subjecting said mixture to a temperature ranging from about 325° C. to about 538° C.

23. The process of claim 1 wherein said oil soluble metal compound is converted to a catalytically active metal component by first heating the oil chargestock containing said added oil soluble compound and said added iron component to a temperature ranging from about 325° C to about 415° C. in the presence of said hydrogen-containing gas to form a catalyst within said oil chargestock and subsequently reacting the oil containing said catalyst with hydrogen under hydroconversion conditions.

24. The process of claim 23 wherein said oil soluble metal compound is converted to said catalytically active metal component in the presence of a gas containing hydrogen and hydrogen sulfide.

25. The process of claim 23 wherein said hydrogen-containing gas comprises from about 1 to about 90 mole percent hydrogen sulfide.

26. The process of claim 1 wherein said oil soluble metal compound is converted to said catalytically active metal component in the presence of a hydrogen-containing gas under hydroconversion conditions thereby forming said catalyst in situ in said oil in said hydroconversion zone and producing a hydroconverted oil.

27. The process of claim 26 wherein said hydrogen containing gas introduced into said hydroconversion zone comprises from about 1 to about 10 mole percent hydrogen sulfide.

28. The process of claim 1 wherein said hydroconversion conditions include a temperature ranging from about 343° C. to about 538° C. (650° to 1000° F.) and a hydrogen partial pressure ranging from about 500 to about 5000 psig.

29. The process of claim 1 wherein the space velocity of said oil chargestock in said hydroconversion zone ranges from about 0.1 to 10 volumes of oil chargestock per hour per volume of hydroconversion zone.

30. In the process of claim 1 wherein the hydroconversion reaction product comprises a hydroconverted oil containing solids, the additional steps which comprise separating at least a portion of said solids from said hydroconverted oil and recycling at least a portion of said solids to step (a) or to the hydroconversion zone.

31. A process for hydroconverting a heavy hydrocarbon oil chargestock, which comprises:
  a. adding to said oil chargestock a particulate solid iron component and an oil soluble molybdenum compound in an amount ranging from about 25 to about 950 weight parts per million, calculated as elemental molybdenum, based on said oil chargestock;
  b. converting said molybdenum compound and said iron component to a catalyst in situ within said chargestock by reacting the resulting mixture with a hydrogen-containing gas in a hydroconversion zone, at hydroconversion conditions including a temperature ranging from about 416° C. to about 538° C. and a hydrogen partial pressure ranging from about 500 psig to about 5000 psig, and
  c. recovering a hydroconverted oil.

32. The process of claim 31 wherein said hydrogen-containing gas comprises from about 2 to about 7 mole percent hydrogen sulfide.

33. In the process of claim 31 wherein the effluent of said hydroconversion zone comprises a hydroconverted oil and solids, the improvement which comprises the additional steps of separating at least a portion of said solids from said effluent and recycling at least a portion of the separated solids to said hydroconversion zone.

* * * * *